(12) United States Patent
Kubo et al.

(10) Patent No.: US 6,936,320 B2
(45) Date of Patent: Aug. 30, 2005

(54) WEATHER STRIP

(75) Inventors: Yoshihisa Kubo, Aichi (JP); Masahiko Ito, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 82 days.

(21) Appl. No.: 10/348,026

(22) Filed: Jan. 22, 2003

(65) Prior Publication Data

US 2003/0157298 A1 Aug. 21, 2003

(30) Foreign Application Priority Data

Jan. 24, 2002 (JP) .................................... P2002-016104

(51) Int. Cl.[7] .............................................. B32B 1/08
(52) U.S. Cl. ...................... 428/36.9; 428/122; 428/131; 49/475.1; 49/490.1; 49/498.1
(58) Field of Search ................ 428/36.9, 122, 428/131; 49/475.1, 479.1, 490.1, 498.1

(56) References Cited

U.S. PATENT DOCUMENTS 4,769,947 A 9/1988 Ogawa et al.
4,854,079 A 8/1989 Karibe et al.
5,407,628 A 4/1995 Nozaki et al.
5,505,602 A 4/1996 Sumi
2001/0034977 A1 11/2001 Hattori

FOREIGN PATENT DOCUMENTS

| EP | 1072380 A2 | 1/2001 |
| GB | 2363816 A | 1/2002 |
| JP | A-7-164978 | 6/1995 |
| JP | A-9-286061 | 11/1997 |
| JP | A-2001-301542 | 10/2001 |
| JP | A-2001-310685 | 11/2001 |

Primary Examiner—Alexander S. Thomas
(74) Attorney, Agent, or Firm—Posz & Bethards, PLC

(57) ABSTRACT

A weather strip has a molded section and extruded sections. A seal part of the molded section is connected to an end face of a hollow seal part of the extruded section. Concave cutout portions, which serve as a deformation facilitating portion or a stress absorbing portion, are respectively formed in regions of the seal part, each of which is located in the vicinity of a connection surface between the seal part and a corresponding one of the extruded sections. The molded section is made of TPO instead of a rubber material. Although stress acting in the direction of extension of the weather strip may be applied, the presence of the concave cutout portions limits the concentration of stress on the connection surface.

10 Claims, 4 Drawing Sheets

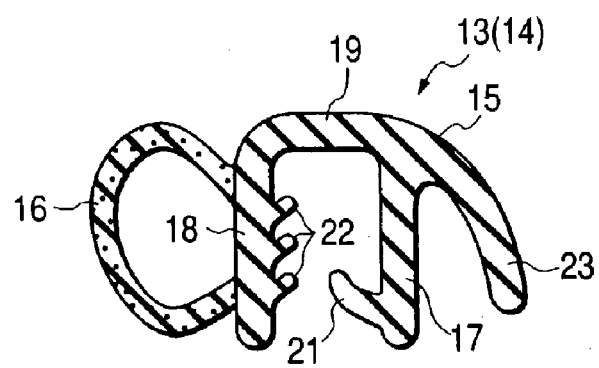
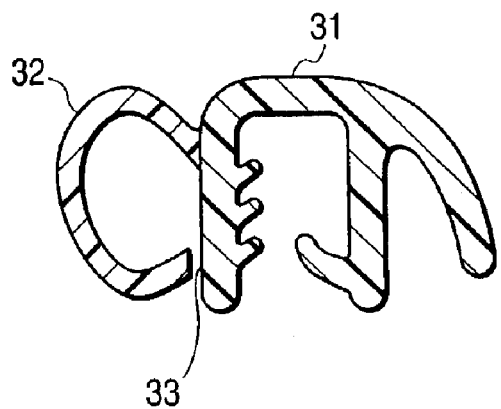
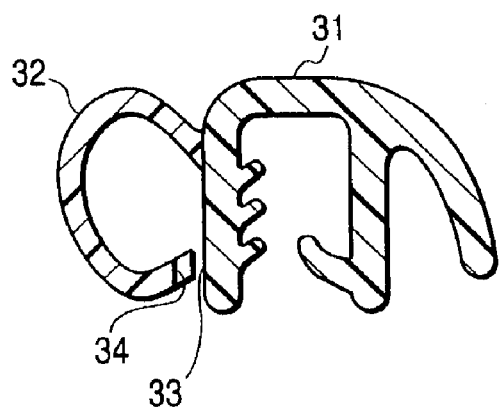

WEATHER STRIP

The present application is based on Japanese Patent Application No. 2002-16104, the entire contents of which are incorporated herein by reference.

BACKGROUND OF THE INVENTION

1. Field of the Invention

The present invention relates to a weather strip mounted along an opening portion of a door opening of a vehicle.

2. Description of the Related Art

Generally, a conventional door opening weather strip is provided along an opening portion of a door opening portion of a vehicle, such as an automobile. The weather strip has a trim part, which is held by a peripheral flange of the door opening, and a hollow seal part provided in such a way as to project from one of side walls of the trim part. The trim part has a substantially U-shaped section. The mounting state of the weather strip can be maintained by fitting this trim part on the flange.

Further, when the door is closed, the seal part is pressured contact with and deformed. Thus, the seal part seals between the door and a vehicle body. One such weather strip portion is mounted on a part corresponding to an upper or side part of the door. Another such weather strip portion is mounted over the entire peripheral flange of the door opening portion. Among such weather strip portions, a substantially rectilinear portion (that is, an extruded section) corresponding to the upper and side part of the door is formed by performing what is called an extrusion method. Further, a corner portion (that is, a molded section), at which the substantially rectilinear portions intersect with each other, is formed by performing a molding method.

Meanwhile, in recent years, conventional weather strips using, for example, thermoplastic polyolefin (TPO) as a material of the molded section, especially, the seal part thereof have come to be known (see, for instance, JP-A-2001-30685). Such employment of TPO as the material of the seal part brings about many merits that the need for performing vulcarization process is eliminated, differently from the case of using rubber as the material of the seal part, and that a molding time can be reduced.

However, in the case that the seal part of the molded section is made of TPO as described above, even when soft TPO is used, the extensibility of the seal part cannot be expected to be as high as that in the case of using rubber. Therefore, when stress acting in the extension direction of the seal part of the molded section is applied thereto after the weather strip is molded, for example, during conveyed, the stress is transmitted to the connection surface between the molded section and the extruded section. Thus, there is a fear that peeling occurs therebetween. This drawback is liable to occur, especially, in the case that the extruded section is made of a material, such as EPDM (ethylene-propylene-diene copolymer), which differs from the material of the molded section.

SUMMARY OF THE INVENTION

The invention is accomplished to solve the problems of the conventional weather strip. Accordingly, an object of the invention is to provide a weather strip, which includes an extruded section having at least a hollow seal part and also includes a molded section having at least a seal part corresponding to the hollow seal part and which is enabled to prevent an occurrence of a drawback that the seal part peels off from the connection surface.

Hereinafter, means for solving the problems are described. Incidentally, operations and effects peculiar to such means are additionally described as needed.

(1) According to an aspect of the invention, there is provided a weather strip (first weather strip) that includes an extruded section having at least a hollow seal part and a molded section having at least a seal part connected to an end face of the hollow seal part of the extruded section. In this weather strip, a deformation facilitating portion for facilitating deformation thereat is formed in at least one of the hollow seal part of the extruded section and the seal part of the molded section in the vicinity of a connection surface between the extruded section and the molded section.

According to the first weather strip, for example, during the weather strip is conveyed, deformation stress may be applied to the weather strip. In this case, in the seal part of the molded section or the hollow seal part of the extruded section, the deformation facilitating portion is provided in the vicinity of the connection surface between the extruded section and the molded section. Further, this portion is easily deformed, as compared with other portions. Thus, the stress of deformation is absorbed owing to the deformation of the deformation facilitating portion. This can suppress an occurrence of a situation in which the deformation stress is concentrated on the connection surface between the extruded section and the molded section. Consequently, the first whether strip can reduce the possibility of an occurrence of peeling on the connection surface. Incidentally, for instance, "concave cutouts", "notches", "slits", "grooves", and "thin portions" may be employed as the "deformation facilitating portions".

Additionally, preferably, in the seal part of the molded section, the deformation facilitating portions, such as slits, are formed in such a way as to be substantially parallel to the connection surface. Further, preferably, in the hollow seal part of the extruded section, the deformation facilitating portion is formed in such a manner as to be approximately perpendicular to the connection surface.

(2) According to another aspect of the invention, there is provided a weather strip (second weather strip) that includes an extruded section having at least a hollow seal part, and a molded section having at least a seal part connected to an end face of the hollow seal part of the extruded section. In this weather strip, a stress absorbing portion for absorbing stress applied in an extension direction thereat is formed in the seal part of the molded section in the vicinity of a connection surface between the molded section and the extruded section.

According to the second weather strip, in the seal part of the molded section connected to the hollow seal part of the extruded section, the stress absorbing portion is formed in the seal part of the molded section in the vicinity of the connection surface between the extruded section and the molded section. Thus, even when the deformation stress is applied to the weather strip, the stress to be applied in the extension direction is absorbed owing to the presence of such a stress absorbing portion. This can suppress an occurrence of a situation in which the deformation stress is concentrated in vicinity of the connection surface between the extruded section and the molded section. Consequently, the second weather strip can reduce the possibility of an occurrence of peeling on the connection surface. Incidentally, for example, "concave cutouts", "notches", "slits", "grooves", and "thin portions" or the like may be employed as the "stress absorbing portions".

(3) According to a third weather strip, an opening part for withdrawing an inner core for molding is formed at a side edge of the seal part of the molded section. Further, the stress absorbing portion is provided in such away as to face the opening part.

According to the third weather strip, an opening part for withdrawing an inner core for molding is formed at a side edge of the seal part of the molded section. Thus, the area of the end face of the seal part of the molded section becomes narrower than that of the hollow seal part of the extruded section by that of the opening part provided therein. Consequently, there is apprehension that the bonding strength at the connection surface is degraded by an amount due to the reduction in the area of the seal part. However, in the third weather strip, the stress absorbing portion is provided in such a way as to face the opening part. Thus, even when the bonding area of the connection surface is reduced owing to the presence of the opening part, the stress is absorbed by the stress absorbing portion provided in such a manner as to face the opening part. Consequently, the concentration of the stress on the connection surface can be more efficiently absorbed. Incidentally, "the stress absorbing portion may be provided in such a way as to face the opening parts and as to extend in a direction substantially perpendicular thereto".

(4) According to a fourth weather strip, the extruded section is made of ethylene-propylene-diene copolymer. Further, in the molded section, at least the seal part is made of olefin-type thermoplastic elastomer (TPO).

According to the fourth weather strip, in the molded section, at least the seal part is made of TPO. Thus, the fourth weather strip has many merits that at such apart, the necessity for performing a vulcarization process upon completion of the molding is eliminated, and that a forming time can be reduced. Moreover, the hollow seal part of the extruded section is made of a material that differs from the material of the seal part of the molded section. Thus, there is apprehension that the bonding strength of the connection surface is degraded, as compared with the case that the hollow seal part and the seal part are made of the same kind of material. However, similarly as the aforementioned first to third weather strip, the fourth weather strip can suppress an occurrence of the situation in which the stress is concentrated on the connection surface. Consequently, the fourth weather strip can reduce the possibility of an occurrence of peeling on the connection surface still more.

(5) According to another aspect of the invention, there is provided a weather strip (fifth weather strip) that includes extruded section having a trim part, whose sectional shape is substantially U-shaped, and having a hollow seal part integrally formed with the trim part, and a molded section having a molded trim part, which is connected to an end face of the trim part of the extruded section, and having a molded seal part connected to an end face of the hollow seal part of the extruded section. In this weather strip, stress absorbing portion for absorbing stress applied in an extension direction is formed in the molded seal part in the vicinity of a connection surface between the molded seal part and the hollow seal part of the extruded section According to the above fifth weather strip, the molded trim part of the molded section is connected to the end face of the trim part of the extruded section, while the seal part of the molded section is connected to the end face of the hollow seal part of the extruded section. In the case of such a weather strip, for instance, during this weather strip is conveyed, the deformation stress may be applied in the extension direction of the neighboring part. In this case, the stress absorbing portion for absorbing stress applied in the extension direction thereat is formed in the molded seal part in the vicinity of the connection surface between the molded seal part and the hollow seal parts of the extruded section. The stress to be applied in the extension direction of the neighboring part thereto is absorbed owing to the presence of such a stress absorbing portion. This can suppress an occurrence of the situation in which the deformation stress is concentrated on the connection surface between the extruded section and the molded section. Consequently, the fifth weather strip can reduce the possibility of an occurrence of peeling on the connection surface. Incidentally, for example, "concave cutouts", "notches", "slits", "grooves", and "thin portions" or the like maybe employed as the "stress absorbing portions".

(6) According to a sixth weather strip, the extruded sections is made of ethylene-propylene-diene copolymer. Further, in the molded section, the molded trim part is made of semihard resin or hard thermoplastic elastomer. Furthermore, in the molded section, at least the molded seal part is made of soft thermoplastic elastomer.

According to the sixth weather strip, the molded section is made of thermoplastic material, such as soft and hard thermoplastic elastomers. Thus, the sixth weather strip brings about many merits that the need for performing a vulcarization process upon completion of the molding is eliminated, and that a forming time can be reduced. Moreover, the molded trim part is made of semihard resin or hard thermoplastic elastomer. Thus, the stability of the weather strip in the mounting state can be ensured. Furthermore, the molded seal part is made of soft thermoplastic elastomer. Thus, a predetermined degree of sealability can be secured. Additionally, the extruded section is made of a material differing from that of the molded section. Thus, there is apprehension that the bonding strength of the connection surface is degraded, as compared with the case that the hollow seal part and the seal part are made of the same kind of material. However, similarly as the aforementioned first to fifth weather strip, the sixth weather strip can suppress an occurrence of the situation in which the stress is concentrated on the connection surface. Consequently, the sixth weather strip can reduce the possibility of an occurrence of peeling on the connection surface still more.

(7) According to a seventh weather strip, an opening part for withdrawing an inner core for molding is formed at a side edge of the molded seal part. Further, the stress absorbing portion is provided in such a way as to face the corresponding opening part.

According to the seventh weather strip, an opening part for withdrawing an inner core for molding is formed at a side edge of the seal part of the molded section. Thus, the area of the end face of the seal part of the molded section becomes narrower than that of the end face of the hollow seal part by that of the opening part provided therein. Consequently, there is apprehension that the bonding strength at the connection surface is degraded by an amount due to the reduction in the area of the end face of the seal part. However, in the seventh weather strip, the stress absorbing portion is provided in such a way as to face the opening part. Thus, even when the connection area of the connection surface is reduced owing to the presence of the opening part, the stress is absorbed by the stress absorbing portions provided in such a manner as to face the opening part. Consequently, the concentration of the stress on the connection surface can be more efficiently absorbed. Incidentally, the stress absorbing portions maybe provided in such a way as to face the opening part and as to extend in a direction substantially perpendicular thereto.

(8) According to an eighth weather strip, the weather strip is adapted as follows. That is, when the molded section is formed, an overflow tab are formed so that the overflow tab adjoins the connection surface between the seal part of the molded section and the hollow seal parts of the extruded sections. Further, the overflow tabs are removed after the molded section is formed. Incidentally, the "overflow tabs" are defined herein as tabs (thick parts) to be provided at a place, which is apart from a gate, so as to fill all over a cavity with a molding material when molding is performed, and to be removed upon completion of the molding.

According to the eighth weather strip, when the molded section is formed, the overflow tab is formed so that the overflow tab adjoins the connection surface between the seal part of the molded section and the hollow seal part of the extruded section. Thus, the material of the molded seal part is more reliably filled into the cavity. Consequently, the maximum connection area can easily be ensured even in the vicinity of the connection surface between the molded seal part and the hollow seal part. Hence, the eighth weather strip can reduce the possibility of an occurrence of peeling on the connection surface still more.

(9) According to a ninth weather strip, the stress absorbing portion is provided in such a manner as to adjoin the overflow tab.

According to the ninth weather strip, the stress absorbing portion is provided at a place adjoining the over flow tab. Thus, a predetermined distance is set between the connection surface and the stress absorbing portion. Therefore, as compared with the case that the stress absorbing portion is provided in such a manner as to directly adjoin the connection surface, the ninth weather strip can more easily absorb the stress applied to the connection surface.

BRIEF DESCRIPTION OF THE DRAWINGS

FIG. 2A is a partly perspective view illustrating a state of the weather strip, which is taken from the side opposite to that from which FIG. 1 is taken.

FIG. 3 is a sectional view illustrating an extruded section;

FIGS. 4A and 4B illustrate a molded section: FIG. 4A is a sectional view taken on line A—A of FIG. 1, and FIG. 4B is a sectional view taken on line B—B of FIG. 1.

DETAILED DESCRIPTION OF THE PREFERRED EMBODIMENTS

Hereinafter, an embodiment of the invention is described with reference to the accompanying drawings.

Figure 1:
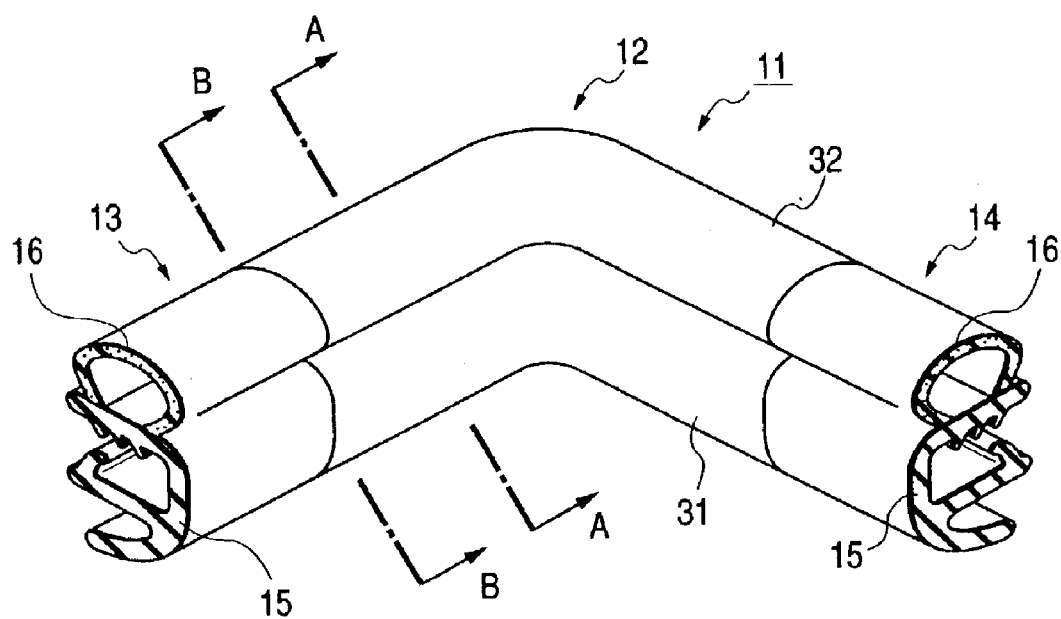
FIG. 1 is a partly perspective view illustrating a weather strip of an embodiment of the invention.

As shown in FIG. 1, a weather strip 11 according to this embodiment is provided along a peripheral flange (not shown) of a door opening portion, and consists of at least one molded section 12, which is formed and substantially L-shaped by performing a molding method, and extruded sections 13 and 14, which are connected to both ends of the molded section 12 and continuously formed by an extrusion method.

As illustrated in FIG. 3, each of the extruded sections 13 and 14 has a trim part 15 and a hollow seal part 16. The trim part 15 is adapted to be held on the flange (not shown) placed along the peripheral edge of the opening portion and has an interior-side side wall 17 and an exterior-side side wall 18, and a connecting portion 19 whose section has a curved shape for connecting both side walls 17 and 18 to each other. The trim part 15 has a substantially U-shaped section as a whole. In the case of this embodiment, the trim parts 15 of the extruded sections 13 and 14 are made of EPDM (ethylene-propylene-diene copolymer) solid rubber. Incidentally, in each of the side walls 17 and 18, a corresponding one of holding lips 21 and 22 inwardly extend. Moreover, a cover lip 23 for covering the interior side is formed in such a manner as to extend from the connecting portion 19. Furthermore, an insert (not shown), such as a metal plate, may be provided in each of the trim parts 15.

Further, hollow seal parts 16 of the extruded sections 13 and 14 are provided on the exterior-side side wall 18 and hollow-shaped, respectively. The hollow seal part 16 is made of EPDM (ethylene-propylene-diene copolymer) sponge rubber. Moreover, when a corresponding door is closed, the hollow seal part 16 is pressured contact with and deformed to thereby seal between the door and the body of an automobile.

As shown in FIG. 4A, the molded section 12 is provided in such a way as to be connected to the end faces of the extruded sections 13 and 14 by being molded. Further, the molded section 12 has the trim part 31 and the seal part 32. The trim part 31 is connected to the end faces of the trim parts 15 and has a sectional shape that is substantially U-shaped, similarly as those of the extruded sections 13 and 14. In this embodiment, the trim part 31 of the molded section 12 is made of hard TPO (Olefin-type thermoplastic elastomer).

Furthermore, the seal part 32 is provided in such a way as to be connected to the end faces of the hollow seal parts 16 of the extruded sections 13 and 14. Incidentally, the seal part 32 is incompletely hollow-shaped and has a side edge portion in which an opening part 33 for withdrawing an inner core 42 for molding (see FIG. 5) is formed in such a manner as to extend in a longitudinal direction. In this embodiment, the seal part 32 is made of soft TPO, which has a flexibility or softness substantially equal to that of the EPDM sponge rubber used in the hollow seal part 16 of the extruded sections 13 and 14, and which is softer than the hard TPO of the trim part 31.

Figure 2A:
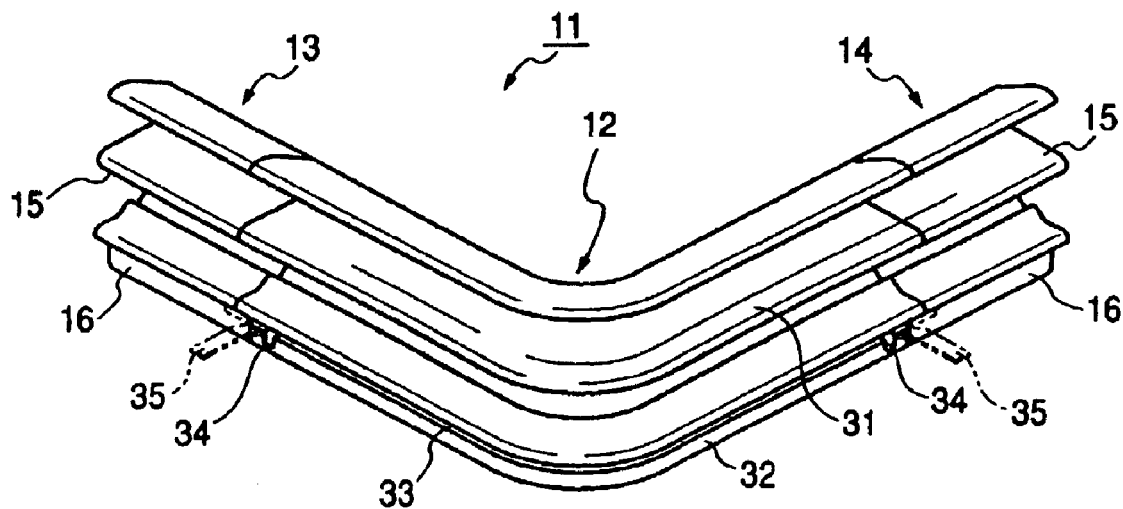
Figure 2B:
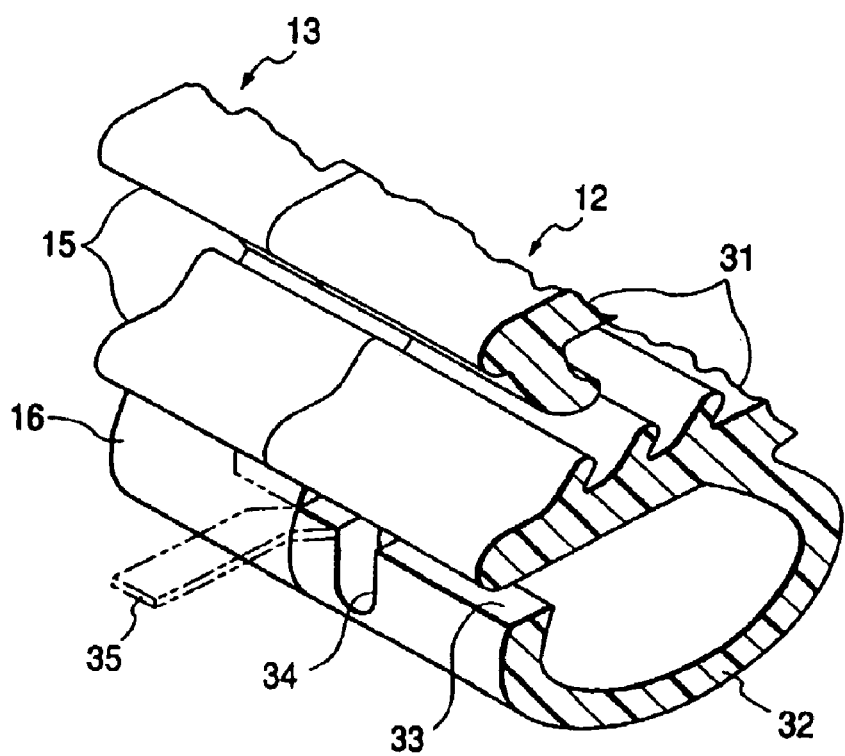
FIG. 2B is a partly perspective view illustrating a primary part of the weather strip.

Further, in this embodiment, as shown in FIGS. 2A, 2B, and 4B, a concave cutout 34 constituting the deformation facilitating portion or the stress absorbing portion is formed at a neighboring portion of the seal part 32, which portion is located in the proximity of the connection surface between the molded section and each of the extruded sections 13 and 14. Each of the concave cutouts 34 adjoins apart corresponding to a corresponding one of overflow tabs 35 (to be described later), and is provided in such a way as to face the opening part 33.

Figure 5:
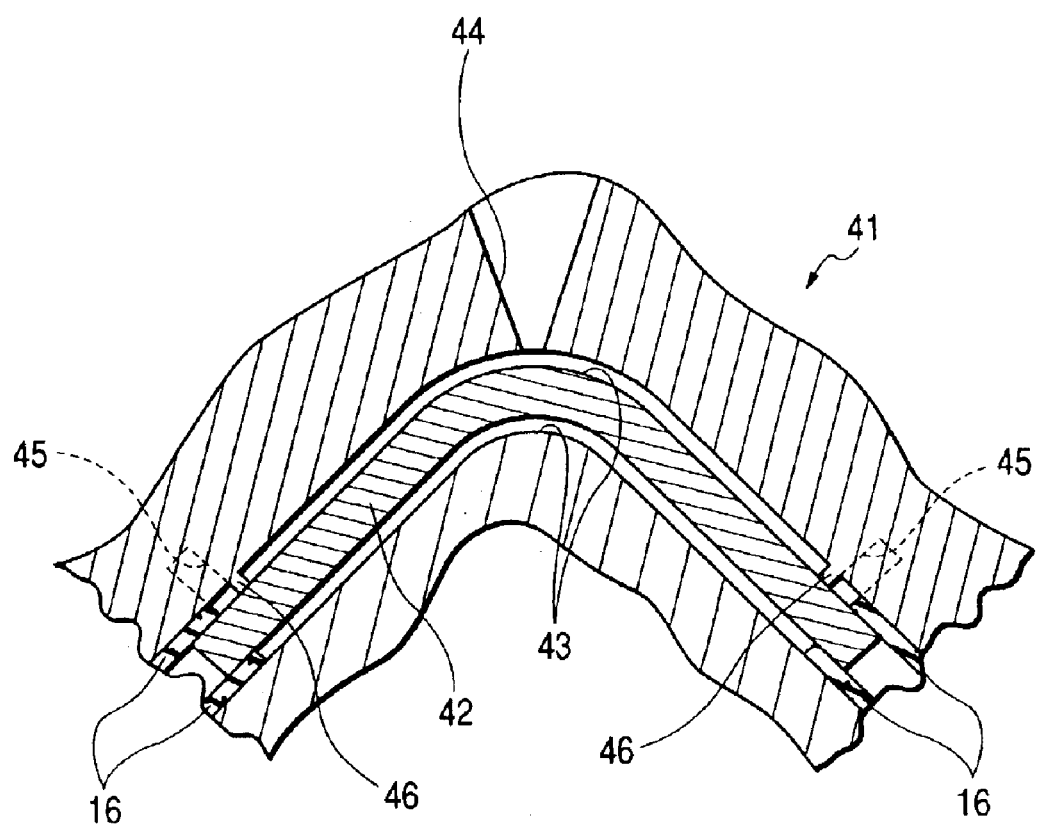
FIG. 5 is a sectional view schematically illustrating a mold for forming the seal part of the molded section.

Incidentally, the process of forming the molded section 12 (especially, the seal part 32) configured as described above is described hereinbelow. When the molded section 12 is formed in this embodiment, what is called a two color injection method is employed. Especially, when the seal part 32 is formed, a mold 41 shown in FIG. 5 is used. The mold 41 has a forming face for forming the seal part 32. An inner core 42 is installed and fixed at a predetermined place therein. Further, a cavity 43 shown in this figure is formed in a state in which the inner core 42 is installed therein.

A gate 44 for injecting soft TPO, which is in a plasticized condition, in the cavity 43 is provided in the mold 41. Further, each of overflow regions 45 is formed at a part (corresponding to the connection surface between the molded section and each of the extruded sections 13 and 14), which part is spaced apart from the gate 44. Moreover, projections 46 for forming the concave cutouts 34 are provided in the mold 41.

Furthermore, during a state in which both the preliminarily formed extruded sections 13 and 14 are set, the plasticized soft TPO is injected into the cavity 43 from the gate 44. At that time, the soft TPO is filled into all over the cavity 43 owing to the presence of the overflow regions 45. Upon completion of filling the soft TPO thereinto, the seal part 32 is formed by hardening the soft TPO. Thereafter, the mold 41 is released, and the inner core 42 is withdrawn from the opening part 33 to thereby obtain the molded section 12 having the seal part 32, thus, obtain the weather strip 11. Incidentally, immediately after the molded section is formed, the overflow tabs 35 respectively corresponding to the overflow regions 45 are formed. However, these tabs 35 are removed in the subsequent process.

As above described in detail, the molded section 12 is made of TPO instead of a rubber material. Hence, this embodiment brings about many merits that the need for performing a vulcarization process is eliminated, differently from the case of using rubber as the material of the seal part, and that thus a forming time can be reduced.

Further, for example, during the weather strip 11 is conveyed, stress may be applied thereto in an extension direction thereof. However, in this embodiment, the concave cutouts 34 are provided at the neighboring parts located in the vicinity of the connection surface between the seal part 32 of the molded section 12, which is connected to the hollow seal parts 16 of the extruded sections 13 and 14, and each of the hollow seal parts 16. Furthermore, the deformation is relatively easily caused by the presence of such concave cutouts 34. Therefore, the stress acting in the extension direction and applied to such neighboring parts and to parts located in the proximity thereof is absorbed by the deformation caused at the neighboring parts. Hence, the stress applied in the extension direction thereto can be restrained from being concentrated on the connection surface. Consequently, this embodiment can reduce the probability of occurrence of peeling, and thus can reduce that of production of defective weather strips.

Moreover, the opening part 33 for withdrawing the inner core 42 is formed in this embodiment. Thus, the area of the end face of the seal part 32 of the molded section 12 becomes narrower than that of the end face of each of the hollow seal parts 16 of the extruded sections 13 and 14 by that of the opening part provided therein. Consequently, there is apprehension that the bonding strength at the connection surface is degraded by an amount due to the reduction in the area of the end face of the seal part. However, in this embodiment, each of the concave cutouts 34 is provided in such a way as to face the opening part 33. Thus, the stress is more positively absorbed at a part in the proximity of each of the concave cutouts 34. Consequently, the concentration of the stress on the connection surface can be more efficiently absorbed.

Additionally, the overflow tabs 35 are formed when the molded section 12 is formed. Thus, the filling of the soft TPO is more reliably performed. Consequently, the maximum connection area can easily be ensured in the connection surface between the molded seal part 12 and the hollow seal part 16. Hence, this embodiment can reduce the possibility of an occurrence of peeling on the connection surface still more. Further, each of the concave cutouts 34 is provided at a place adjoining a part corresponding to a corresponding one of the overflow tabs 35. Thus, a predetermined distance is set between the connection surface and each of the concave cutouts 34. Therefore, as compared with the case that each of the concave cutouts 34 is provided in such a manner as to directly adjoin the connection surface, this embodiment can more easily ensure the connection area. On the other hand, each of the concave cutouts 34 is provided at an extremely close range from the connection surface through the overflow tab 35 in this embodiment. Therefore, in comparison with the case that the concave cutouts 34 are disposed in such a way as to be spaced apart from the connection surface, the stress applied to the connection surface can be absorbed still more. Consequently, the operations and effects of the invention can be more reliably achieved.

The invention is not limited to the embodiment described in the foregoing description. The invention may be practiced, for instance, in the following manner. Needless to say, other applications and modifications of the invention may be made.

(a) Although the shape of the molded section 12 is set in such a way as to be almost the same as that of each of the extruded sections 13 and 14 in the embodiment, the molded section may be constituted only by the seal part 32. In this case, preliminarily, the hollow seal part provided at the intermediate part of each of the extruded parts are partially removed. Then, the seal part 32 is connected to the cut portion by performing the molding method. Even when such a constitution of the weather strip is employed, basically, operations and effects similar to those of the aforementioned embodiment can be achieved.

(b) Further, although the concave cutouts 34 are provided during the mold formation in the embodiment, a cutout operation may be performed after the molding. That is, each of the deformation facilitating portion and the stress absorbing portion is not limited to the concave cutouts 34. As long as the concentration of the stress can be absorbed, notches, slits, grooves, and thin portions can be suitably employed.

(c) The number of the extruded sections 13 and 14 is not necessarily 2. For instance, the weather strip may be configured so that both ends of a single extruded section are connected to the molded section 12. Alternatively, the weather strip may be configured so that three or more extruded sections are connected by using a plurality of molded sections.

(d) Although the overflow tags 35 are formed when the molded section 12 is formed, the formation of these tabs 35 may be omitted.

(e) Although EPDM is exemplified as the material of each of the extruded sections 13 and 14, other rubber of elastic materials, such as IR (isoprene rubber) and CR (chloroprene rubber), may be used.

(f) Although the weather strip, in which the concave cutouts 34 are provided in the seal part 32 of the molded section 12, has been described in the foregoing description of the embodiment, each of concave cutouts 34 may be formed as the deform facilitating portion in such a way as to be extended from the opening part 33 to the hollow seal parts 16 of the extruded sections 13 and 14 in a direction approximately perpendicular to the connection face.

What is claimed is:

1. A weather strip comprising:
   an extruded section having at least a hollow seal part; and
   a molded section having at least a seal part connected to an end face of said hollow seal part of said extruded section, wherein:

a deformation facilitating portion for facilitating deformation thereat is formed in at least one of said hollow seal part of said extruded section and said seal part of said molded section closely adjacent to a connection surface between said extruded section and said molded section;

said extruded section is made of ethylene-propylene-diene copolymer; and at least said seal part is made of olefin thermoplastic elastomer in said molded section.

2. A weather strip comprising:

an extruded section having at least a hollow seal part;

a molded section having at least a seal part connected to an end face of said hollow seal part of said extruded section, wherein:

a stress absorbing portion for absorbing stress applied in an extension direction thereat is formed in said seal part of said molded section closely adjacent to a connection surface between said molded section and said extruded section;

said extruded section is made of ethylene-propylene-diene copolymer; and at least said seal part is made of olefin thermoplastic elastomer in said molded section.

3. A weather strip according to claim 2, wherein an opening part for withdrawing an inner core for molding is formed at a side edge of said seal part of said molded section, and said stress absorbing portion is formed so as to face said opening part.

4. The weather strip according to claim 3, wherein the stress absorbing portion extends in a direction that is substantially parallel to the connection surface.

5. The weather strip according to claim 3, wherein the stress absorbing portion is defined by a cutout in the seal part, and walls that define the cutout are substantially parallel to the connection surface.

6. A weather strip including:

an extruded section having a trim part whose sectional shape is substantially U-shaped and having a hollow seal part integrally formed with said trim part;

a molded section having a molded trim part which is connected to an end face of said trim part of said extruded section and having a molded seal part connected to an end face of said hollow seal part of said extruded section, wherein:

a stress absorbing portion for facilitating deformation thereat as well as for absorbing stress applied in an extension direction thereat is formed in said molded seal part closely adjacent to a connection surface between said molded seal part and said hollow seal part of said extruded section;

said extruded section is made of ethylene-propylene-diene copolymer; and at least said seal part is made of olefin thermoplastic elastomer in said molded section.

7. A weather strip according to claim 6, wherein said extruded section is made of ethylene-propylene-diene copolymer, said molded trim part of said molded section is made of semi hard resin or hard thermoplastic elastomer, and said molded seal part of said molded section is made of soft thermoplastic elastomer.

8. A weather strip according to claim 6, wherein an opening part for withdrawing an inner core for molding is formed at a side edge of said molded seal part, and wherein said stress absorbing portion is formed so as to face said opening part.

9. A weather strip according to claim 6, wherein:

when said molded section is formed, an overflow tab is formed in said molded seal part adjacent to said connection surface between said molded seal part and said hollow seal part of said extruded section, and after forming said molded section, said overflow tab is removed; and the connection surface and the stress absorbing portion are spaced apart from one another by a distance that corresponds to a width dimension of the overflow tab.

10. A weather strip according to claim 9, wherein said stress absorption portion is provided in such a manner as to adjoin a part corresponding to said overflow tab.

* * * * *